United States Patent [19]
Soderquist et al.

[11] Patent Number: 6,145,872
[45] Date of Patent: Nov. 14, 2000

[54] AIRBAG CUSHION ATTACHMENT

[75] Inventors: Quin Soderquist, South Weber; Lance M. Bosgieter, Roy, both of Utah

[73] Assignee: Autoliv ASP, Inc., Ogden, Utah

[21] Appl. No.: 09/229,114

[22] Filed: Jan. 13, 1999

[51] Int. Cl.[7] .................................................. B60R 21/16
[52] U.S. Cl. ......................................................... 280/728.2
[58] Field of Search ............................. 280/728.2, 743.1, 280/743.2, 738, 739, 741, 736, 740

[56] References Cited

U.S. PATENT DOCUMENTS

| | | |
|---|---|---|
| Re. 34,204 | 3/1993 | Takada . |
| 4,830,401 | 5/1989 | Honda . |
| 5,094,477 | 3/1992 | Togawa . |
| 5,098,125 | 3/1992 | Thornton et al. . |
| 5,141,247 | 8/1992 | Barth . |
| 5,141,787 | 8/1992 | Yamamoto . |
| 5,172,932 | 12/1992 | Watanabe et al. . |
| 5,186,489 | 2/1993 | Imai . |
| 5,280,952 | 1/1994 | Hirabayashi et al. . |
| 5,294,148 | 3/1994 | Imai . |
| 5,405,166 | 4/1995 | Rogerson . |
| 5,560,643 | 10/1996 | Lang et al. . |
| 5,573,270 | 11/1996 | Sogi et al. . |
| 5,580,080 | 12/1996 | Soderquist et al. . |
| 5,634,658 | 6/1997 | Adams . |
| 5,685,562 | 11/1997 | Jordan et al. . |
| 5,707,711 | 1/1998 | Kitamura . |
| 5,765,867 | 6/1998 | French . |

FOREIGN PATENT DOCUMENTS

| | | |
|---|---|---|
| 2109477 | 5/1972 | France . |
| 63-207754 | 8/1988 | Japan . |
| 8-225050 | 9/1996 | Japan . |
| 2268124 | 1/1994 | United Kingdom . |

*Primary Examiner*—Eric Culbreth
*Attorney, Agent, or Firm*—Sally J. Brown

[57] ABSTRACT

Arrangements and methods for attaching an airbag cushion wherein the airbag cushion "floats" or is movable relative to an airbag module element extending through an opening in the cushion with a first end of the module element disposed within the cushion inflatable body and a second end of the module element extending out of the cushion inflatable body. Upon deployment of the corresponding airbag cushion, such floating or movable attachment can help avoid stress concentrations and complications associated therewith.

30 Claims, 9 Drawing Sheets

AIRBAG CUSHION ATTACHMENT

BACKGROUND OF THE INVENTION

This invention relates generally to vehicle occupant passive restraint systems and, more particularly, to improved arrangements and methods for attaching airbag cushions such as used in such systems.

It is well known to protect a vehicle occupant by means of an inflatable vehicle occupant restraint, such as in the form of a cushion or bag, commonly referred to as an "airbag cushion." In practice, it is common that inflatable vehicle occupant restraints be designed to inflate into a location within the vehicle between the occupant and certain parts of the vehicle interior, such as the doors, steering wheel, instrument panel or the like, to prevent or avoid the occupant from forcibly striking such parts of the vehicle interior. In practice, such airbag cushions are typically inflated or expanded with gas when the vehicle encounters sudden deceleration, such as in the event of a collision.

In such systems, airbag cushions are normally housed in an uninflated and folded condition to minimize space requirements. Such systems also typically include one or more crash sensors mounted on or to the frame or body of the vehicle to detect sudden decelerations of the vehicle and to electronically trigger activation of the system. Upon actuation of the system, such as upon receipt of an appropriate signal from the associated system crash sensor, the cushion begins to be inflated, in a matter of no more than a few milliseconds, with gas produced or supplied by a device commonly referred to as an "inflator."

Airbag module assemblies typically involve the manufacture, installation and checking of many and various component parts. Common airbag module assembly components typically include a cover, an airbag cushion, a means for holding the airbag cushion such as an annular retainer or retaining ring, a supporting plate such as a module housing or mounting plate, a gas generator or inflator, fasteners and means to attach the assembly to a steering wheel, dashboard or other appropriate vehicle structure.

It is common that in such airbag module assemblies, a central inflation gas inlet opening of the airbag cushion be held or otherwise clamped between a flange of the inflator and an annular retaining ring through a module housing or mounting plate. Rivets or other form of fasteners are typically used to attach the retaining ring to the gas inlet opening of the airbag cushion. The retaining ring, with the airbag cushion affixed thereto, is then bolted to the module housing and the flange of the inflator with the inflator so arranged that the flange thereof is positioned externally of the airbag cushion and the module housing.

As will be appreciated, in order to permit the inflation of an airbag cushion within the relatively short available time period, gas or other inflation medium is generally expelled or discharged from an associated inflator at a relatively high flow rate or velocity. Such high flow rate or velocity discharges can create forces within the airbag cushion such as may tend to blow or otherwise force the airbag cushion from the inflator.

In such assemblies, the force holding the airbag cushion to the inflator and the module housing may concentrate to form undesirable shearing stresses on the assembly and in particular on the airbag cushion at the fastening site. In view thereof, airbag cushions are commonly fabricated to include several reinforcement layers in the vicinity of the central inflation gas inlet opening whereat the airbag cushion is held or otherwise clamped. While the inclusion of such reinforcement layers may help the airbag cushion to structurally withstand such deployment stresses, the inclusion of such reinforcements almost invariably increases the cost of either or both manufacture and assembly.

Further, the use of rivets, bolts or other, similar, fastening means to attach an airbag cushion to an associated retainer ring or other module component can be a cause for reworking inflator module assemblies in the manufacture thereof. When reworking is not possible, defective airbag modules must be discarded.

In addition, while a strong form of joinder, attachment or mounting of an airbag cushion with an associated inflator or airbag module structure is generally desired to better assure retention of the airbag cushion upon deployment thereof, it is also generally desirable that the form of joinder, attachment or mounting be simple to implement and inexpensive to produce.

Thus, there is a need and a demand for the provision of improved arrangements and methods for attaching airbag cushions used in vehicle occupant passive restraint systems.

In particular, there is a need and a demand for arrangements and methods for attaching airbag cushions used in vehicle occupant passive restraint systems which minimize or avoid the problems and associated failure possibilities which may exist or be associated with module assemblies which rely on the use of multiple rivets, bolts or other, similar, fastening means to attach an airbag cushion to an associated retainer ring or other module component and which may further reduce or minimize the costs associated with either or both the manufacture and assembly thereof.

SUMMARY OF THE INVENTION

A general object of the invention is to provide improved arrangements and methods for attaching an airbag cushion such as used in vehicle occupant passive restraint systems.

A more specific objective of the invention is to overcome one or more of the problems described above.

The general object of the invention can be attained, at least in part, through a specified airbag module combination which includes an inflatable airbag cushion and a module element. The cushion includes an inflatable body which defines an opening wherethrough, upon deployment of the cushion, gases can exit to, at least in part, deflate the cushion. The module element extends through the cushion opening. The module element has opposed first and second ends with the first end disposed within the inflatable body and the second end extending out of the inflatable body. Upon inflation of the cushion, the cushion opening is movable relative to the module element along the longitudinal length thereof with the first end of the module element including a stop to limit movement of the cushion opening relative to the longitudinal length of the module element.

The prior art generally fails to provide a form of joinder, attachment or mounting of an airbag cushion with an associated inflator or airbag module structure which is either as effective, simple or economical as may be desired and such as may avoid deployment stress concentrations and complications associated therewith as effectively as may be desired.

The invention further comprehends an airbag module combination in accordance with another embodiment of the invention and which combination also includes an inflatable airbag cushion and an inflator. The cushion includes an inflatable body defining an opening wherethrough, upon deployment of the cushion, gases can exit to, at least in part, deflate the cushion. The inflator is housed within the cushion inflatable body. The inflator includes at least one longitudinally-extending projection extending through the cushion opening whereby an end of the longitudinally-extending projection extends out of the inflatable body. Upon inflation of the cushion, the cushion opening is movable relative to the longitudinally-extending projection along the longitudinal length thereof with the inflator forming a stop to limit movement of the cushion opening relative to the longitudinal length of the projection.

In accordance with yet another embodiment, the invention still further comprehends a method of joining an inflatable airbag cushion in an airbag module. Such a method includes the step of forming a specified airbag module combination including an inflatable airbag cushion and a module element. The inflatable airbag cushion includes an inflatable body defining an opening wherethrough, upon deployment of the cushion, gases can exit to, at least in part, deflate the cushion. The module element extends through the cushion opening and has opposed first and second ends. The first end is disposed within the inflatable body and the second end extends out of the inflatable body. The cushion opening is movable relative to the module element along the longitudinal length thereof upon inflation of the cushion. The first end of the module element includes a stop to limit movement of the cushion opening relative to the longitudinal length of the module element upon inflation of the cushion.

Other objects and advantages will be apparent to those skilled in the art from the following detailed description taken in conjunction with the appended claims and drawings.

DETAILED DESCRIPTION OF THE INVENTION

The present invention, as described in greater detail below, provides improved arrangements and methods for attaching airbag cushions such as used in an inflatable restraint system such as used to provide protection to vehicle occupants.

While the invention is described below with particular reference to a driver side airbag module assembly combination for automotive vehicles including vans, pick-up trucks, and particularly automobiles, it is to be understood that the invention also has applicability not only with other types or kinds of airbag module assemblies including, for example, passenger side, side impact and curtain airbag assemblies such as used for automotive vehicles but also with other types or kinds of vehicles including, for example, airplanes.

Figure 1:
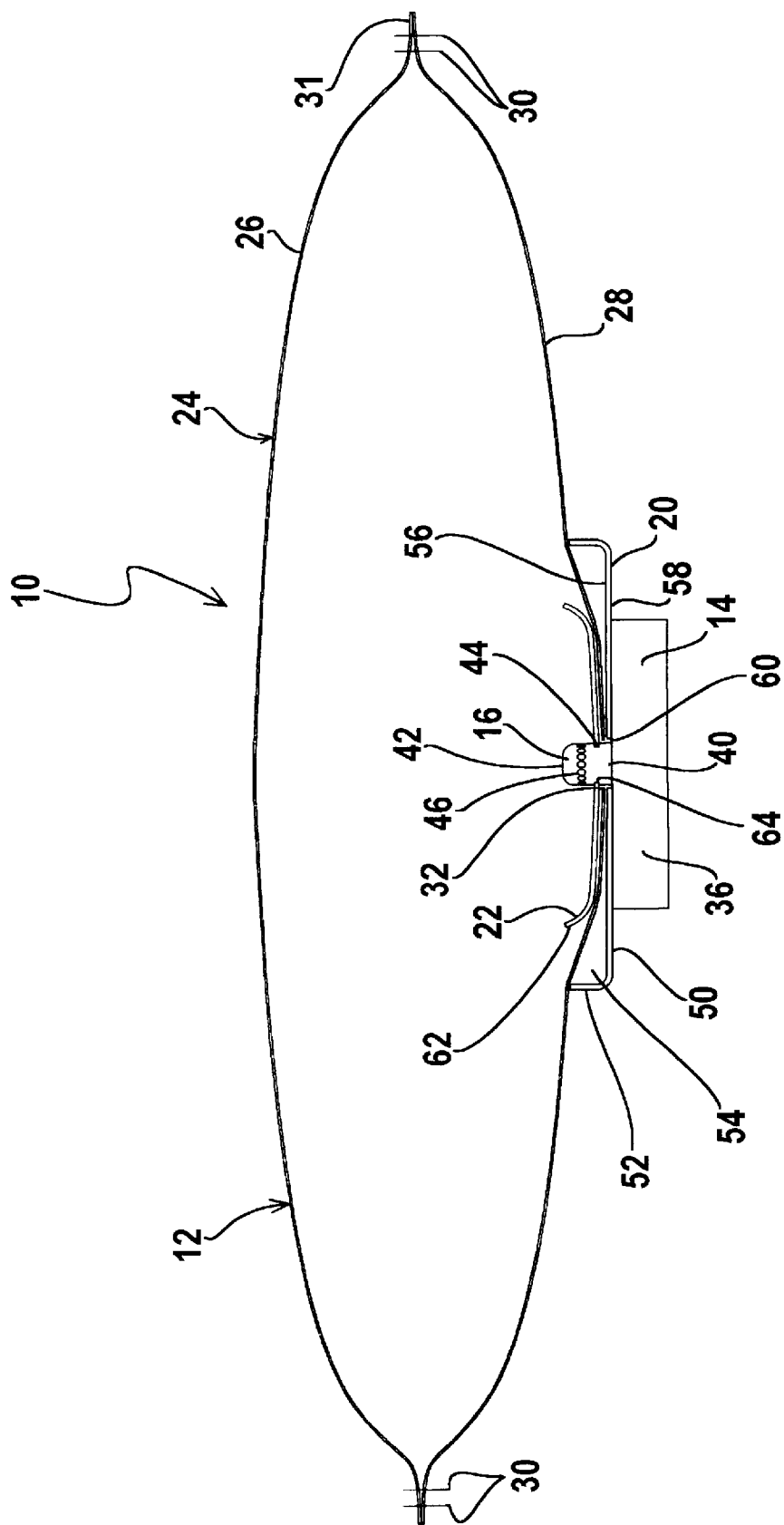
FIG. 1 is a simplified, partially in section, side view of an airbag cushion and inflator in accordance with a first embodiment of the invention.

Referring to the drawings and initially referring particularly to FIG. 1, there is illustrated an airbag module assembly combination, generally designated by the reference numeral 10, in accordance with one embodiment of the invention. It is to be understood that in the practice of the invention, such an airbag module assembly combination is commonly housed or secured in association with an appropriate corresponding or cooperating portion of an associated vehicle (not shown). In the case of a driver side module installation, such an assembly combination is typically housed in or secured to the steering wheel. In the case of a passenger side module installation, such an assembly is normally housed in what is alternatively commonly referred to as the instrument panel or dashboard of the vehicle opposite the passenger seat.

The assembly combination 10 includes an airbag cushion 12, an inflatable restraint system inflator 14, a diffuser 16, a reaction or mounting plate 20 and an airbag retainer plate 22.

The airbag cushion 12 includes a main body 24 and may, in the broader practice of the invention, take any form such as well known in the art. For example, two circular pieces of suitable airbag cushion material, such as of suitable woven material or fabric, may be laid one on top of the other and a seam formed about their periphery.

As will be appreciated, airbag cushion materials suitable for use in the practice of the invention can take various forms such as may be desired and as are known in the art. All or selected portions of particular airbag cushions in accordance with the invention can be permeable or substantially impermeable to the passage of inflation fluid therethrough. For example, as is known in the art, particular airbag cushions can be fabricated such that one or more selected portions of the cushion, e.g., the front panel, are rendered or otherwise made substantially impermeable to the passage of the particular inflation fluid therethrough.

As also known in the art, substantial impermeability of an airbag cushion or selected portions thereof can be achieved or arrived at by various techniques such as including or applying a selected material coating onto a particular airbag fabric material or by producing an airbag fabric material of a sufficiently tight weave as to render the resulting fabric substantially impermeable, for example. It is to be understood, however, that the broader practice of the invention is not limited to airbag cushions fabricated of any particular material or by any particular process.

Figure 3:
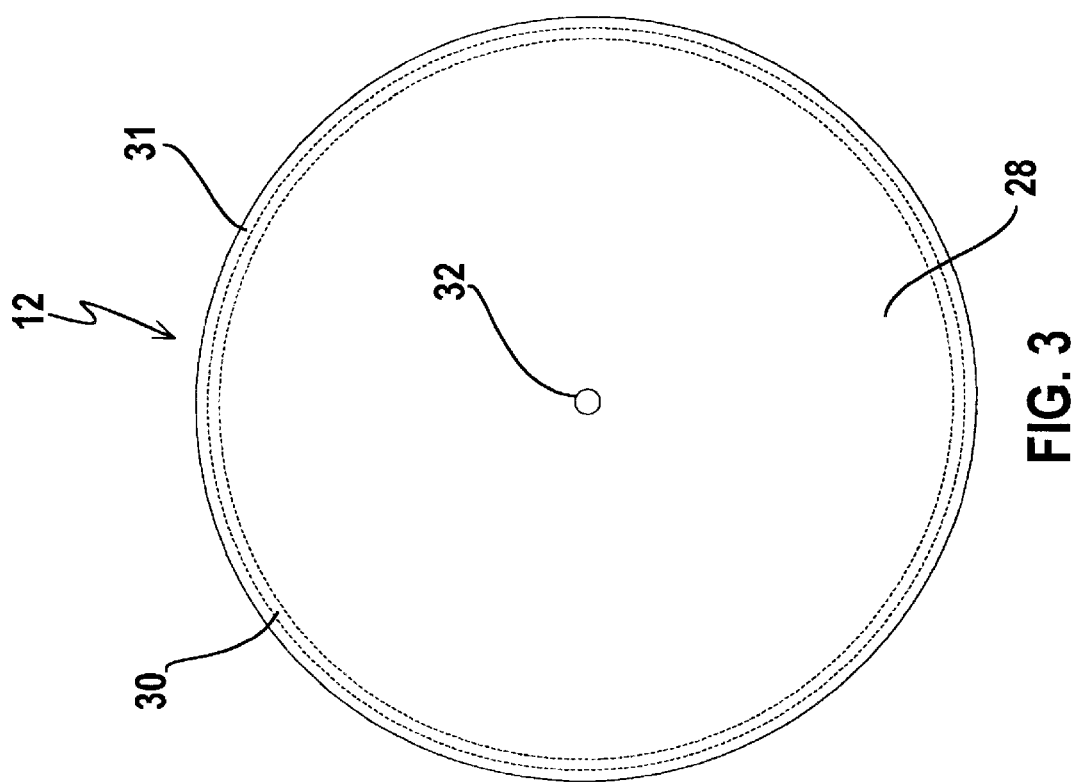
FIG. 3 is a simplified bottom plan view of the airbag cushion shown in FIGS. 1 and 2.
Figure 2:
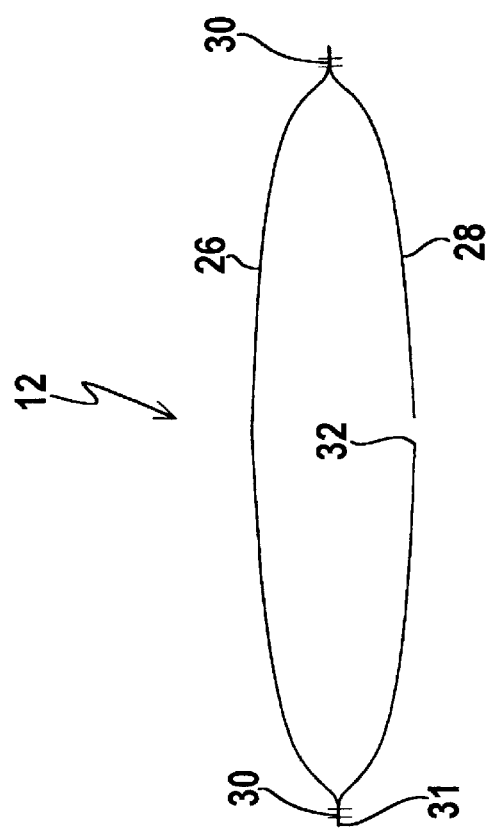
FIG. 2 is a simplified sectional side view of the airbag cushion shown in FIG. 1.

The particular airbag cushion 12, as perhaps best viewed by reference to FIGS. 2 and 3, is generally composed of generally circular front and back panels, 26 and 28, respectively, with the respective peripheries thereof generally joined together by a double stitch sew line 30, with the outer diameter sew selvage 31 exposed or external the completed airbag cushion. The back panel 28 includes a generally centrally located or positioned opening or hole 32, the use of which will be described in greater detail below.

It is to be appreciated that, if desired and such as also described in greater detail below, other particular forms of airbag cushions can be used in the practice of the invention. With whichever type of airbag cushion employed, the corresponding airbag cushion main body will typically include an opening or hole in the form of an opening or cut out in the airbag cushion material.

Returning to FIG. 1, the inflator 14 is generally elongated and cylindrical in shape. Upon actuation, the inflator 14 is adapted to provide gas or other inflation fluid used to inflate the airbag cushion 12. The inflator 14 includes a chamber portion 36 which, as shown, may desirably have the general form of a tube. The inflator 14 generally operates, such as in a manner well known in the art, to generate, produce, form or otherwise provide inflation gas for the inflation of the associated airbag cushion 12. Common or known inflator devices which can be used in the practice of the invention include compressed stored gas inflators, pyrotechnic inflators and hybrid inflators, for example. As will be appreciated, the broader practice of the invention is not limited or otherwise restricted by the particular form or mode of operation of the associated inflator device.

The diffuser 16 is also generally elongated and cylindrical in shape. The diffuser includes a first end 40, a generally opposite distal second end 42 and an attachment notch 44, the use of which will be described in greater detail below, spaced between the first and second ends, respectively. The diffuser first end 40 is joined, connected or otherwise attached to the inflator chamber 36 such that upon actuation of the inflator 14, the inflator chamber 36 is in communication with the diffuser 16 such as to permit inflation fluid to be transmittable therethrough. The diffuser 16 extends through the cushion opening 32 with the diffuser second end 42 disposed within the interior of the cushion 12. The diffuser second end 42 includes a plurality of apertures 46 wherethrough, upon actuation and such as in a manner known in the art, inflation gases can be appropriately discharged or "diffused" into the interior of the airbag cushion 12 to effect the inflation thereof.

The reaction plate 20 is generally rectangular in shape and includes a bottom wall 50 and a surrounding upwardly extending side wall 52 such as to form, such as in cooperation with an associated module cover (not shown), an airbag storage volume 54. The reaction plate bottom wall 50 has an inner side 56, an outer side 58 and includes a generally circular opening 60. The inflator diffuser 16 may be inserted into the reaction plate bottom wall opening 60, from the bottom wall outer side 58, and subsequently through the cushion opening 32, which cushion opening is generally adjacent the reaction plate bottom wall opening 60 at the inner side 56, thereof.

It will be appreciated that other types or forms of reaction plate may be used in the practice of the invention and thus the broader practice of the invention is not necessarily limited by the type or form of reaction plate. For example, circular, oval, triangular and square shaped reaction plates can, if desired be used. Further, a reaction plate in accordance with the invention need not necessarily include an upwardly extending side wall such as to form a corresponding airbag storage volume. For example, a flat or essentially flat reaction plate may be used in association with a concave, dish-shaped module cover to form a desired airbag storage volume. The size of the reaction plate utilized in an airbag assembly combination in accordance with the invention will commonly be selected based on either or both the size of the associated airbag cushion and the styling of the associated module cover.

Returning to FIG. 1, the airbag retainer plate 22 is generally sized and shaped to cooperate with the reaction plate 20. For example, in FIG. 1, the airbag retainer plate 22 is generally sized and shaped to fit within the reaction plate 20. The airbag retainer plate 22 has an upwardly extending lip section 62 around the outer periphery thereof. The airbag retainer plate 22 also includes a generally circular central opening 64.

The inflator diffuser 16 may be inserted into the airbag retainer plate central opening 64, with the central opening fitting in a securing or mating engagement with the attachment notch 44 about the cylindrical diffuser 16.

In such an arrangement, the airbag cushion opening 32 and the associated portion of the airbag cushion itself are not fixed, clamped or set in one specific position relative to the associated inflator 14 and hardware, including the reaction plate 20 and the airbag retainer plate 22. Instead, the airbag cushion opening 32 and the associated portion of the airbag cushion is free to move or "float" albeit ultimately limited or restricted by the combination of the inflator 14 with the airbag retainer plate 22, which serves as a stop to limit the movement of the cushion opening relative to the longitudinal length diffuser.

In operation, such as upon the sensing of a collision, an electrical signal is sent to the inflator 14 and results in the discharge of inflation gas through the inflator diffuser 16 and out the apertures 46 into the interior of the airbag cushion 12. During the inflation of the airbag cushion and subsequently, post-deployment, the airbag cushion opening 12 may move about the inflator diffuser 16 along the length thereof between the reaction plate 20 and the airbag retainer plate 22.

The airbag cushion opening 32 can also advantageously serve as a vent wherethrough, upon deployment of the cushion, gases exit to, at least in part, deflate the cushion. In contrast with common traditional cushion vents, however, the opening vent 32 of the airbag cushion in the subject airbag module combinations and forms of attachment includes a module element extending therethrough. In the airbag module assembly combination 10, described above, the module element extending through the cushion opening 32 is the diffuser 16.

As will be appreciated, the amount or extent of such venting of gases through the cushion opening 32 is generally dependent on various operational and design factors such as the inflation gas pressure within the cushion, the configuration of module component housed within the airbag cushion, the relative size or diameter of the cushion opening relative to the size or diameter of the module element extending through the cushion opening, as well as the size of the gap or the floating range of the cushion opening along the longitudinal length of the module element.

In the assembly combination 10 described above, the airbag retainer plate 22 forms a module component housed within the airbag cushion 12 and which module component is substantially planar and coplanar with the cushion inflatable body in the vicinity of the airbag cushion opening 32. As will be appreciated, the inclusion of such a module component within an associated airbag cushion can be accomplished or achieved by various techniques including, for example, placing the module component between the front and back panels of a yet unsewn or partially sewn airbag cushion and then completing the sewing of the airbag cushion.

It will be appreciated that the broader practice of the invention is not necessarily limited or restricted to airbag module assembly combinations and airbag cushion forms of attachment wherein the module element extending through the cushion opening is a diffuser. For example, the module element extending through a respective airbag cushion opening may, if desired, take the form of a stud or shaft.

Figure 4:
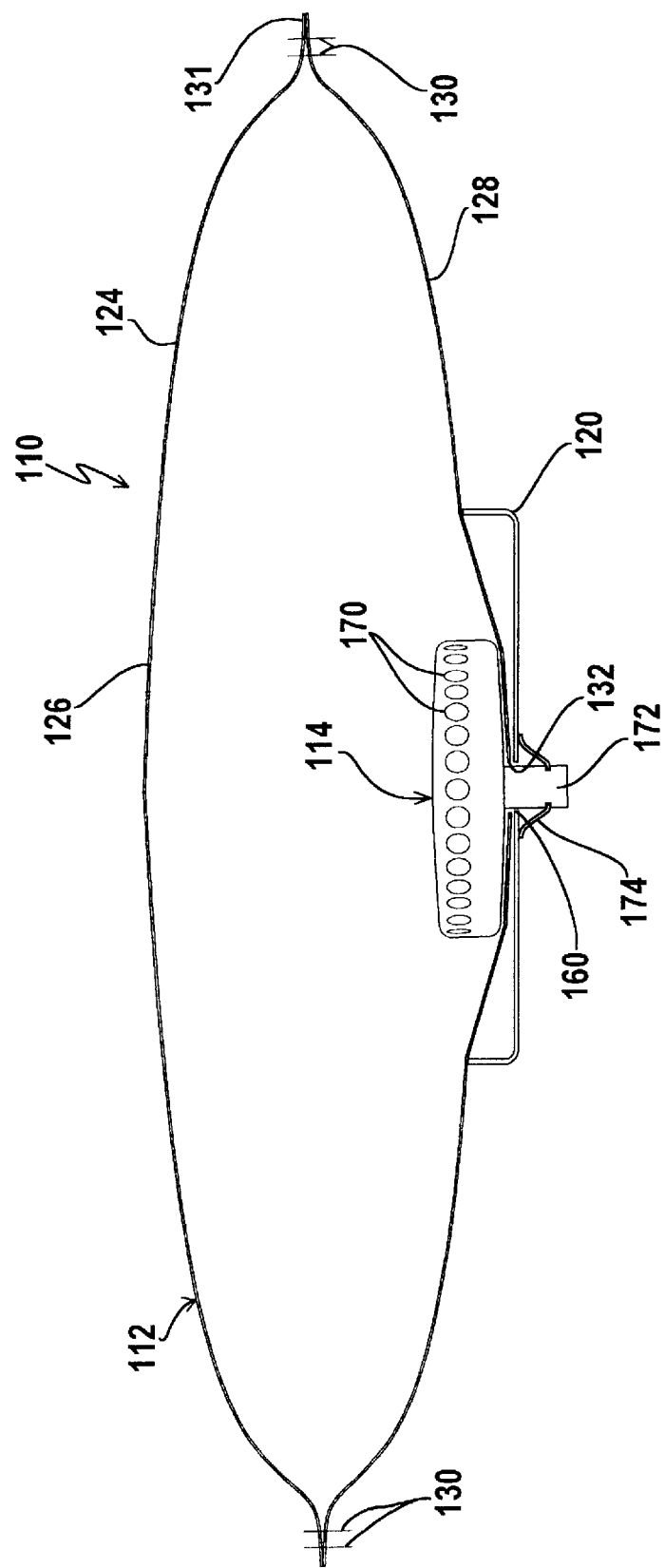
FIG. 4 is a simplified, partially in section, side view of an airbag cushion and inflator in accordance with an alternative embodiment of invention.

Turning to FIG. 4, there is illustrated an airbag module assembly combination, generally designated by the reference numeral 110, in accordance with one such alternative embodiment of the invention.

The assembly combination 110 includes an airbag cushion 112, an inflatable restraint system inflator 114 and a reaction or mounting plate 120.

To facilitate discussion, the airbag cushion 112 is generally similar to the airbag cushion 12, described above, and includes a main body 124 generally composed of generally circular front and back panels, 126 and 128, respectively, with the respective peripheries thereof generally joined together by a double stitch sew line 130 to form a normally external outer diameter sew selvage 131. The back panel 128 similarly includes a generally centrally located or positioned opening or hole 132.

In the assembly combination 110, however, the module component housed within the airbag cushion 112 is the inflatable restraint system inflator 114, itself. While the inflator 114 can be variously shaped, when housed within an airbag cushion, an inflator having a concave or dish-shaped contour can be beneficial in facilitating cushion retention.

The inflator 114 includes a plurality of apertures 170 wherethrough, upon actuation and such as in a manner known in the art, inflation gases can be appropriately discharged or "diffused" into the interior of the airbag cushion 112 to effect the inflation thereof. Thus, in the assembly combination 110 there is no separate diffuser element.

The inflator 114 also includes at least one longitudinally-extending projection 172, such as in the form of a stud or shaft and such as may be used to mount or join the assembly combination 110 in or to an associated vehicle. In accordance with the invention, the projection 172 forms a module element extending through the cushion opening 132. Thus, the inflator module component 114 is housed within the airbag cushion 112 with the inflator shaft projection 172 extending through the cushion opening 132.

As will be appreciated, the longitudinally extending projection 172 can be formed hollow or otherwise serve as a conduit joining the inflator module component 114 housed within the airbag cushion 112 with the associated actuation sensor device(s) (not shown).

The inflator shaft projection 172 subsequently also extends through a central opening 160 in the reaction plate 120 and a snap-fit attachment ring 174 of the reaction plate.

The assembly combination 110, similar to the assembly combination 10 described above, permits the airbag cushion opening 132 and the associated portion of the airbag cushion to be free to move or "float" albeit ultimately limited or restricted by the combination of the inflator 114 and the reaction plate 120. More specifically, the inflator 114 forms a stop to limit movement of the cushion opening 132 relative to longitudinal length of the projection 172.

In operation, such as upon the sensing of a collision, an electrical signal is sent to the inflator 114 and results in the discharge of inflation gas out through the apertures 170 into the interior of the airbag cushion 112. During the inflation of the airbag cushion and subsequently, post-deployment, the airbag cushion opening 132 may move about the inflator shaft projection 172 along the length thereof between the inflator 114 and the reaction plate 120.

Again, the airbag cushion opening 132 advantageously can also serve as a vent wherethrough, upon deployment of the cushion, gases can exit to, at least in part, deflate the cushion.

In the assembly combinations 10 and 110 described above, a module component, be it the airbag retainer plate 22 or the inflator 114, is housed within the respective airbag cushion, 12 and 112, respectively.

As with the above-described embodiment illustrated in FIGS. 1–3, the airbag cushions used in accordance with the invention can be fabricated of various suitable coated and uncoated materials, such as are known in the art.

The invention has been described above relative to assembly combinations employing a very simple airbag cushion construction. While the utilization of such a simple airbag construction may have many practical and economical advantages, it is to be appreciated that the broader practice of the invention is not necessarily limited to use with such simplified airbag constructions. For example, FIGS. 5–16 illustrate alternative preferred airbag cushion constructions which may be employed as part of airbag module assembly combinations in accordance with the invention.

Figure 6:
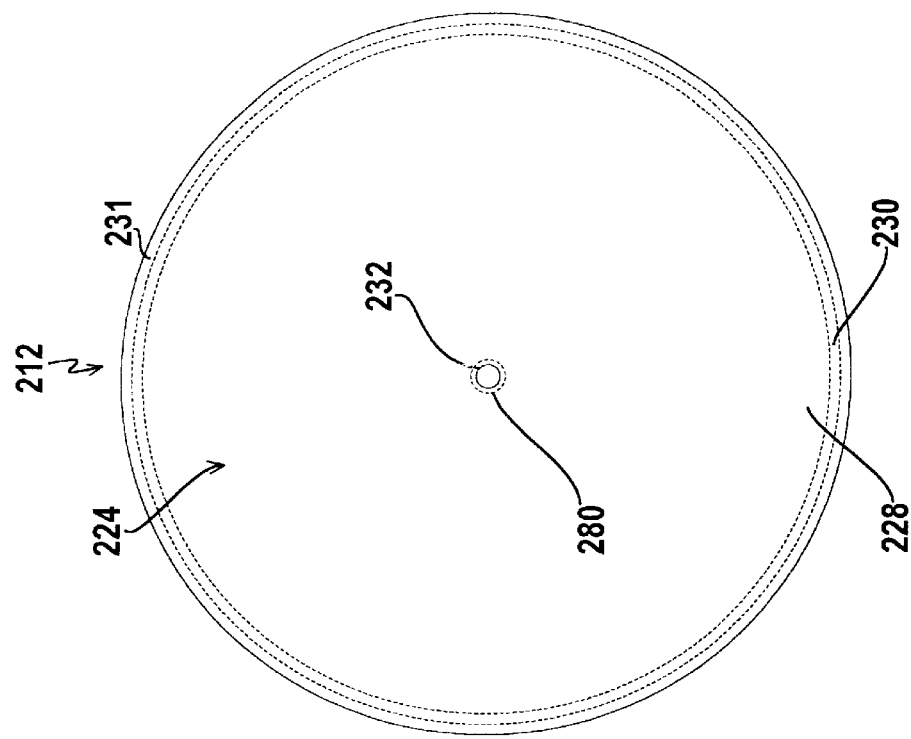
FIG. 6 is a simplified bottom plan view, similar to FIG. 3, of the airbag cushion shown in FIG. 5.
Figure 5:
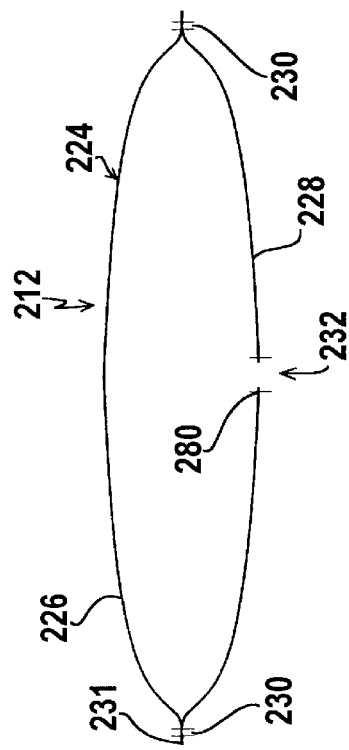
FIG. 5 is a simplified sectional side view, similar to FIG. 2, of an alternative airbag cushion design for use in the practice of the invention.

Turning first to FIGS. 5 and 6, there is illustrated an airbag cushion 212 which, similar to the airbag cushion 12, described above, includes a main body 224 generally composed of generally circular front and back panels, 226 and 228, respectively, with the respective peripheries thereof generally joined together by a double stitch sew line 230 to form a normally external outer diameter sew selvage 231. The back panel 228 of the airbag cushion 212 also similarly includes a generally centrally located or positioned opening or hole 232. The cushion opening 232 includes a sew line 280 of reinforcing stitches about the periphery thereof. The inclusion of such an airbag cushion opening sew line may be desirable to provide additional reinforcement to the opening and thus further assist the avoidance or resistance of tearing or failure by the airbag cushion or respective airbag module assembly combinations formed therewith.

As will be appreciated, such a sew line can be in the form of a single or multiple lines of stitches.

Figure 8:
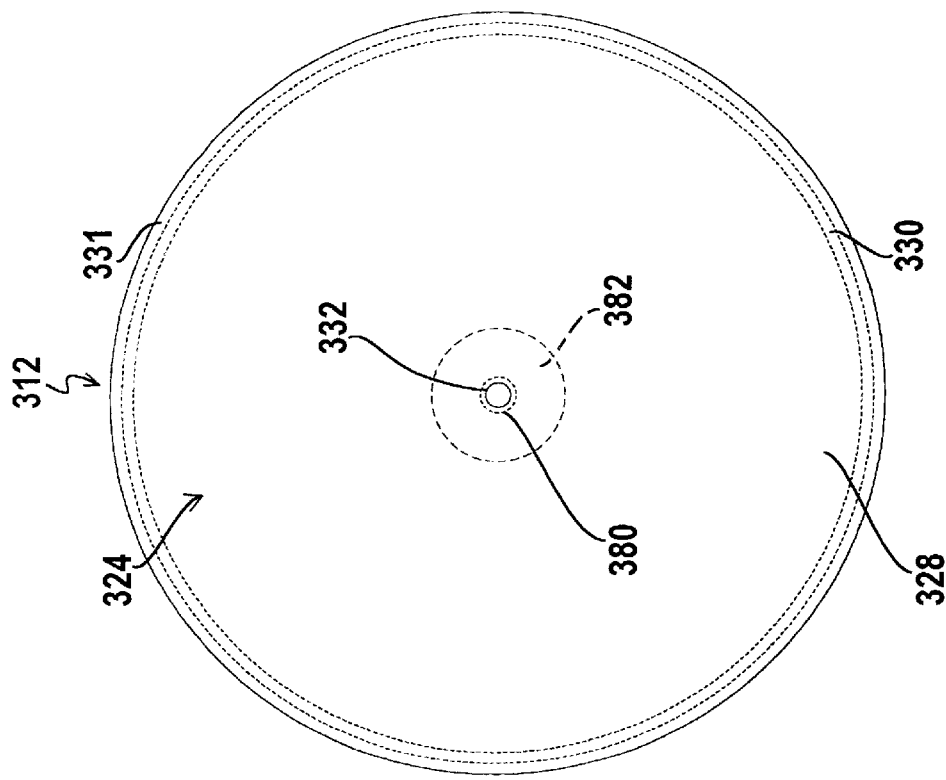
FIG. 8 is a simplified bottom plan view, similar to FIG. 3, of the airbag cushion shown in FIG. 7.
Figure 7:
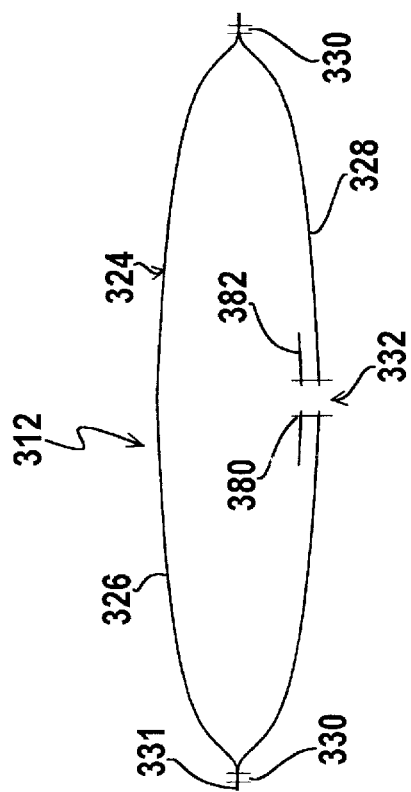
FIG. 7 is a simplified sectional side view, similar to FIG. 2, of another alternative airbag cushion design for use in the practice of the invention.

FIGS. 7 and 8 illustrate an airbag cushion, generally designated by the reference numeral 312, in accordance with another alternative embodiment of the invention. The airbag cushion 312 includes a main body 324 generally composed of generally circular front and back panels, 326 and 328, respectively, with the respective peripheries thereof generally joined together by a double stitch sew line 330 to form a normally external outer diameter sew selvage 331. The back panel 328 of the airbag cushion 312 also includes a generally centrally located or positioned opening or hole 332 having a sew line 380 about the periphery thereof, similar to the airbag cushion 212, described above.

The airbag cushion 312 differs from the above-described airbag cushion 212, however, in that the sew line 380 additionally serves to attach of a reinforcement layer of airbag material, designated by the reference numeral 382, at the airbag cushion opening 332, within the interior of the airbag cushion 312. Such a reinforcement layer may be included in those assembly combinations where additional reinforcement and stress resistance by the airbag cushion is desired.

It will be appreciated that such reinforcement layer of airbag material may be of the same or different construction or formulation as the material used in the construction of the inflatable body of the cushion. Further, it is to be appreciated that multiple reinforcement layers may, if desired, be employed in the construction of the airbag cushion for use in an assembly combination in accordance with the invention. In practice, however, a single reinforcement layer typically provides adequate desired reinforcement for most applications. Still further, it is to be appreciated that such single or multiple reinforcement layers can be alternatively internally (as shown) or externally joined to an associated cushion main body, as may be desired.

Figure 10:
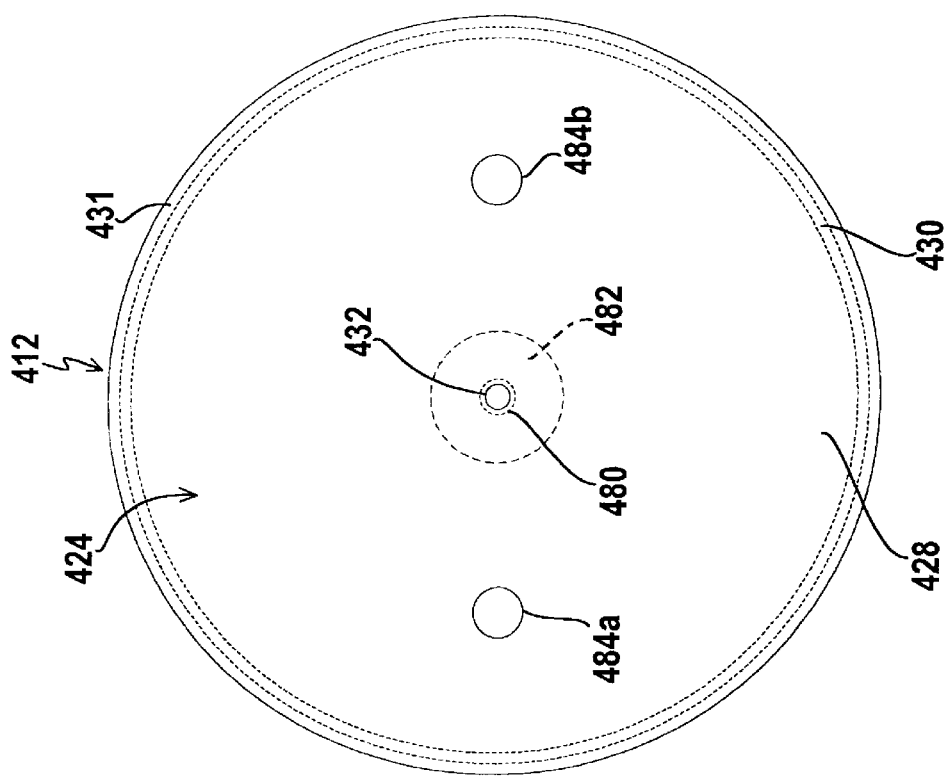
FIG. 10 is a simplified bottom plan view, similar to FIG. 3, of the airbag cushion shown in FIG. 9.
Figure 9:
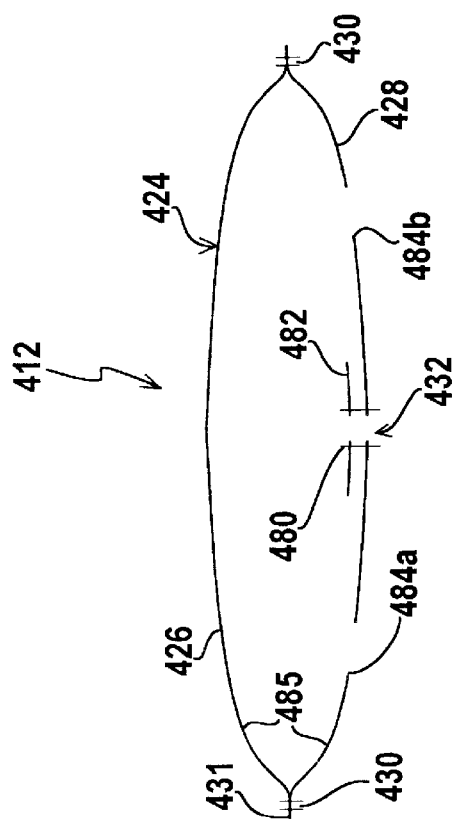
FIG. 9 is a simplified sectional side view, similar to FIG. 2, of yet another alternative airbag cushion design for use in the practice of the invention.

FIGS. 9 and 10 illustrate an airbag cushion, generally designated by the reference numeral 412, in accordance with yet another alternative embodiment of the invention. As with the above-described airbag cushion embodiments, the airbag cushion 412 includes a main body 424 generally composed of generally circular front and back panels, 426 and 428, respectively, with the respective peripheries thereof generally joined together by a double stitch sew line 430 to form a normally external outer diameter sew selvage 431. The back panel 428 of the airbag cushion 412 also includes a generally centrally located or positioned opening or hole 432 having a sew line 480 about the periphery thereof and which serves to attach a reinforcement layer of airbag material 482 similar to the airbag cushion 312, described above.

The airbag cushion 412 differs from the above-described airbag cushion 312, however, in the inclusion of discrete vent holes 484a and 484b, respectively, suitably placed in the airbag cushion material. For example, in the airbag cushion 412, the discrete vent holes 484a and 484b are each positioned about the back panel 428 such as may be desired to result in inflation gas exhaust or venting from the airbag cushion 412 in a general direction normally away or opposite from an occupant seated opposite the cushion front panel 426. As will be appreciated by one skilled in the art, the number, size and placement of such vent holes in a particular airbag cushion design can be appropriately selected in order to provide specifically desired corresponding inflation and deployment performance.

For example, the inclusion of such vent holes may be desired in particular inflatable restraint installations such as to produce or result in a more rapid or immediate exhausting of inflation gas from the corresponding airbag cushion. More specifically, the inclusion of one or more of such discrete vent holes may be desired in installations employing an airbag cushion wherein both the front and back panels, 426 and 428, respectively, are each coated with a coating 485 or otherwise rendered substantially impermeable to the passage of inflation fluid therethrough. It will be appreciated, however, that the incorporation of discrete vent holes in airbag cushions in accordance with the invention is not limited to those airbag cushion main bodies which are otherwise substantially impermeable to the passage of inflation fluid therethrough. For example, uncoated or otherwise permeable airbag cushions may, if desired and dependent on the particular application, include one or more such vent holes.

As will be appreciated, an airbag cushion can, if desired, include such a vent hole or holes without necessarily including one or more reinforcement layer of material 482.

Figure 12:
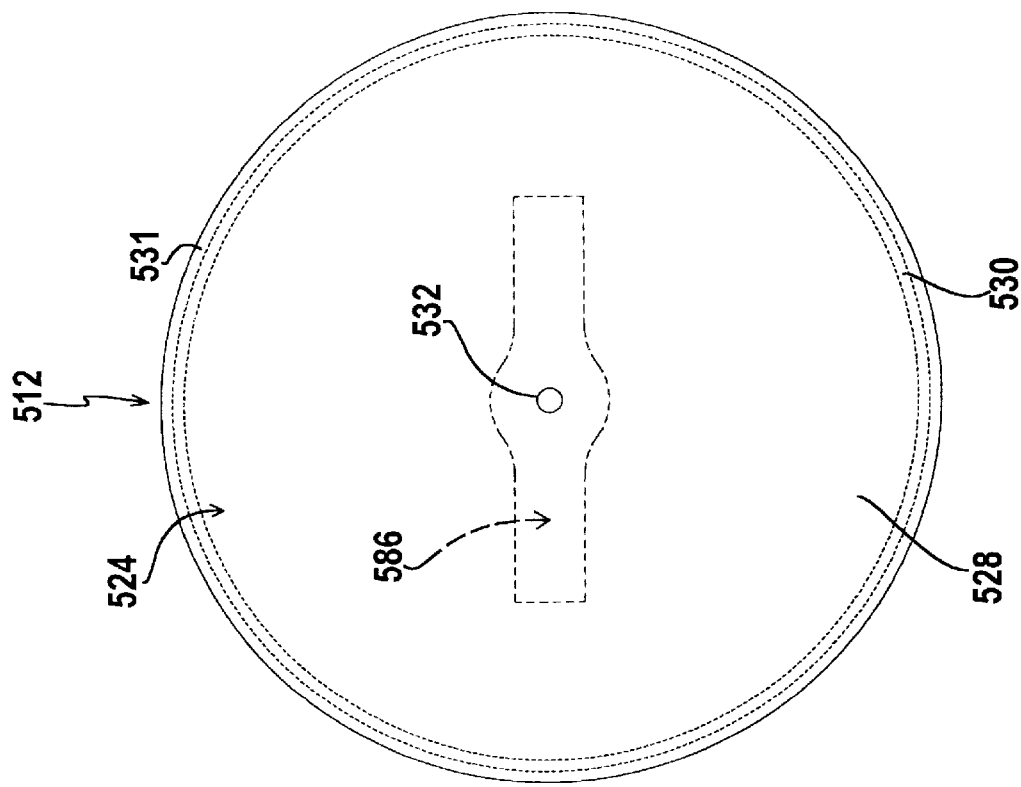
FIG. 12 is a simplified bottom plan view, similar to FIG. 3, of the airbag cushion shown in FIG. 11.
Figure 11:
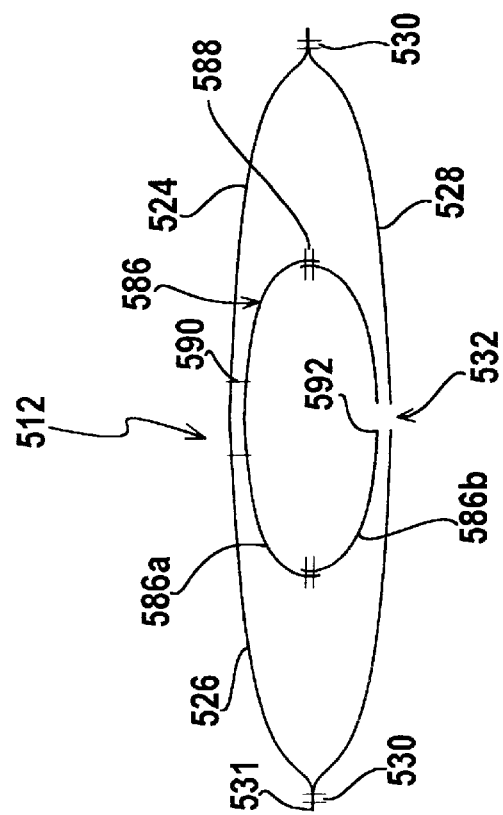
FIG. 11 is a simplified sectional side view, similar to FIG. 2, of yet still another alternative airbag cushion design for use in the practice of the invention.

FIGS. 11 and 12 illustrate an airbag cushion, generally designated by the reference numeral 512, in accordance with yet still another alternative embodiment of the invention. The airbag cushion 512, similar to the airbag cushions 12 and 112 described above, includes a main body 524 generally composed of generally circular front and back panels, 526 and 528, respectively, with the respective peripheries thereof generally joined together by a double stitch sew line 530 to form a normally external outer diameter sew selvage 531. The back panel 528 of the airbag cushion 512 also includes a generally centrally located or positioned opening or hole 532.

The airbag cushion 512 differs from the above-described airbag cushions 12 and 112, however, in the inclusion of an internal tether 586. The tether 586 is composed of a base tether portion 586a and a tether airbag cushion opening portion 586b such as joined together by a double stitch sew line 588. The base tether portion 586a is desirably attached or otherwise joined within the airbag cushion 512 such as by being sewn to the inside of cushion front panel 526, such as shown by the sew line 590. The tether airbag cushion opening portion includes an opening or hole 592 generally corresponding to the airbag cushion opening 532 formed in the cushion back panel 528.

In assemblies with the airbag cushion 512, the tether opening 592 and the airbag cushion opening 532 can desirably be aligned to facilitate assembly such as by permitting the simultaneous extension of the module element through the cushion opening 532 and the tether opening 592. An airbag module assembly in accordance with the invention and including the airbag cushion 512 permits the airbag cushion opening 532 and the tether opening 592 to generally similarly move relative to the corresponding module element.

Figure 14:
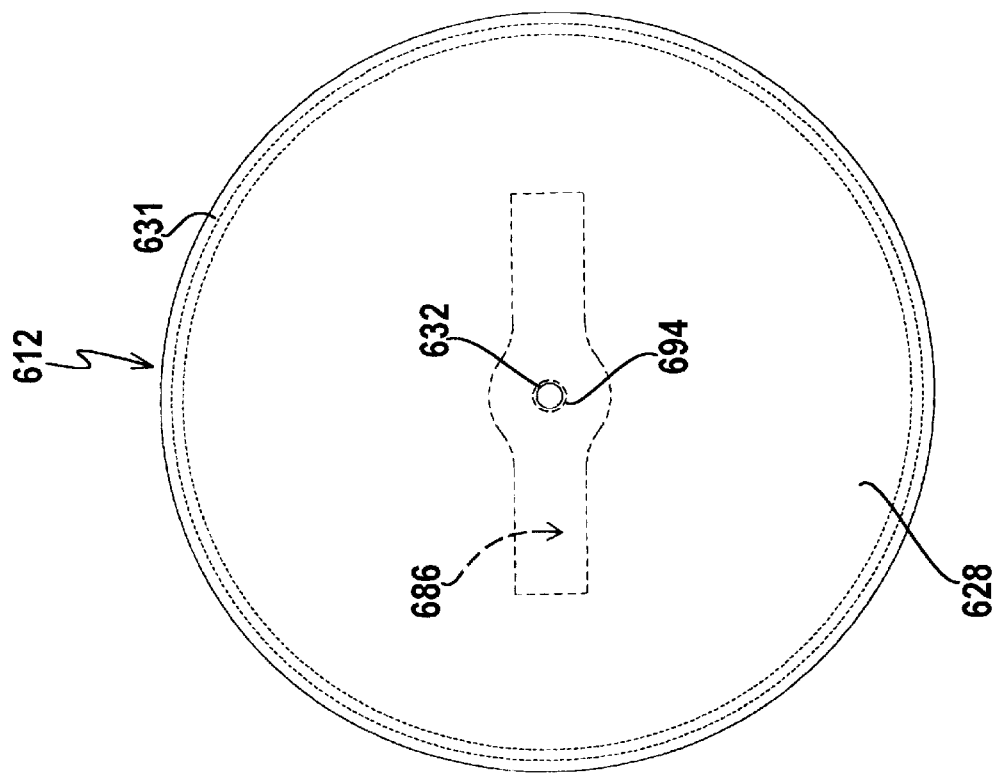
FIG. 14 is a simplified bottom plan view, similar to FIG. 3, of the airbag cushion shown in FIG. 13.
Figure 13:
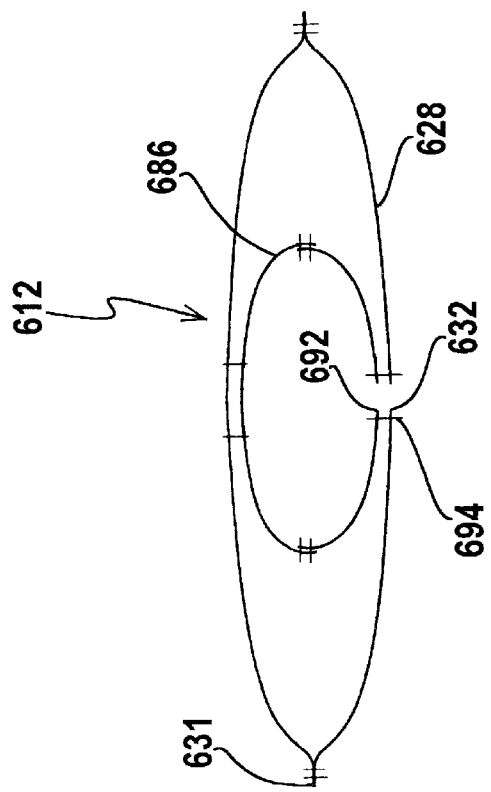
FIG. 13 is a simplified sectional side view, similar to FIG. 2, of yet still even another alternative airbag cushion design for use in the practice of the invention.

FIGS. 13 and 14 illustrate an airbag cushion, generally designated by the reference numeral 612, for use in another embodiment of the invention. The airbag cushion 612 is generally similar to the airbag cushion 512 described above with the added feature that the internal tether 686 is joined or attached to the back panel 628, such as by means of a sew line 694 joining the periphery of the cushion opening 632 with the periphery of the tether opening 692, such as may be desired to facilitate alignment of the tether opening 692 with the cushion opening 632 during the assembly process.

It will be appreciated that the various features of the above-described airbag cushions such as including: altering the permeability of a selected portion or more of a particular airbag cushion such as by the inclusion of a coating or altering the structure of the cushion material; inclusion of a sew line around the periphery of the cushion opening; inclusion of one or more reinforcement layers; inclusion of one or more discrete vent holes; and inclusion of an internal cushion tether such sewn to the inside of the front panel and either attached or not to the back panel, can be combined in various combinations as may be deemed desirable for particular vehicular restraint system applications.

Figure 16:
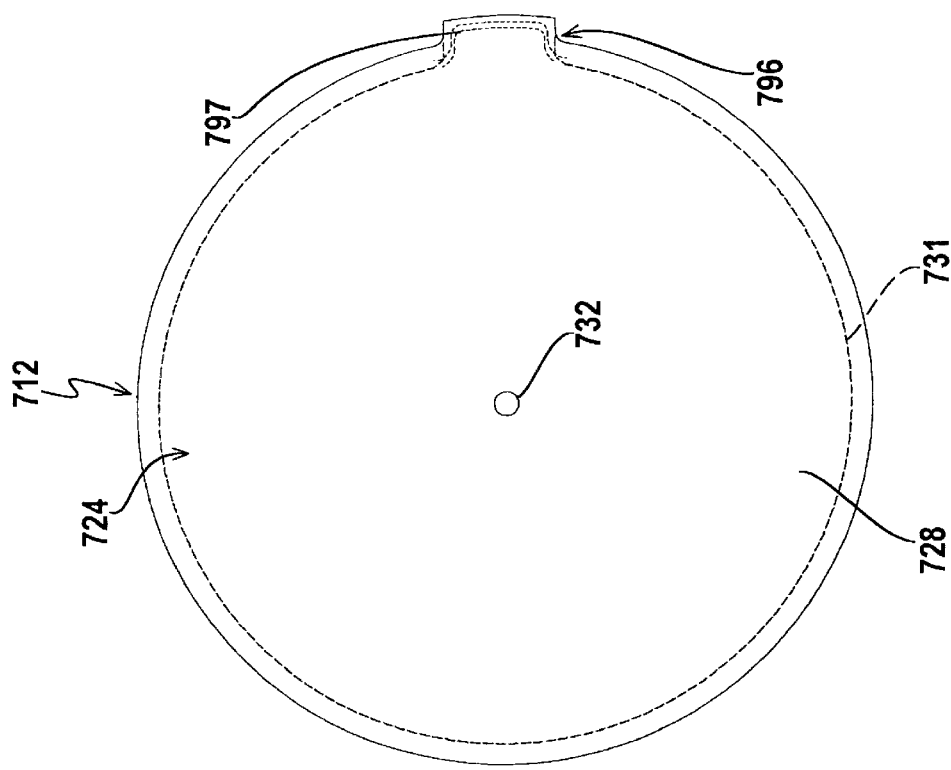
FIG. 16 is a simplified bottom plan view, similar to FIG. 3, of the airbag cushion shown in FIG. 15.
Figure 15:
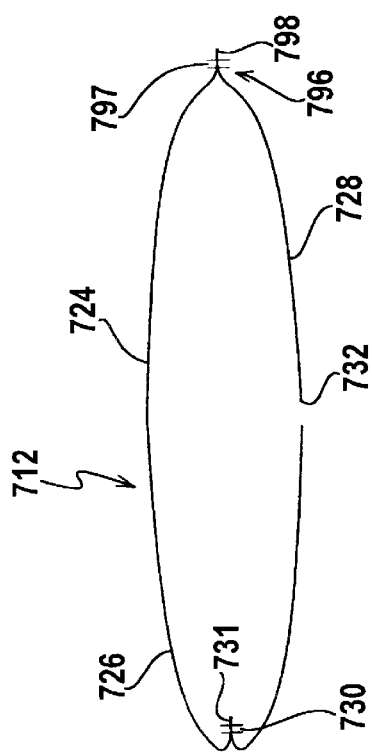
FIG. 15 is a simplified sectional side view, similar to FIG. 2, of an it additional alternative airbag cushion design for use in the practice of the invention.

FIGS. 15 and 16 illustrate an airbag cushion, generally designated by the reference numeral 712, for use in another embodiment of the invention. The airbag cushion 712 is generally similar to the airbag cushion 12 described above except that the outer diameter sew selvage is generally contained within the cushion. Such an airbag cushion is generally fabricated in a traditional manner with the cushion forming a main body 724 which may, in the broader practice of the invention, take any form such as well known in the prior art. For example, two circular pieces of suitable airbag cushion material, such as of suitable fabric, can be laid one on top of the other and a seam formed about their periphery. The particular airbag cushion 712 is generally composed of generally circular front and back panels, 726 and 728, respectively. The airbag cushion back panel 728 includes a generally centrally located or positioned opening or hole 732, such as in the manner and function described above.

The airbag cushion 712 may be fabricated by initially joining together the respective peripheries of the front and back panels, 726 and 728, respectively, with the exception of a small inversion section 796 of the partially stitched together airbag cushion. For example, the respective peripheries of the front and back panels can be joined together by means of a double stitch sew line 730 and such as to form an outer diameter sew selvage 731.

As identified above, the respective peripheries of the front and back panels are not initially stitched together at the inversion section 796 which is desirably large enough to permit the partially stitched together airbag cushion to be turned inside out and the placement within the airbag cushion of an airbag retainer plate, in the case of an airbag module assembly combination such as shown in FIG. 1, or an inflatable restraint system inflator, in the case of an airbag module assembly combination such as shown in FIG. 4.

Upon being turned inside out, the outer diameter sew selvage 731 will then be internal to the airbag cushion 712. The peripheries of the front and back panels, at the inversion section 796, can be stitched together such as also by means of a double stitch sew line 797, with the outer diameter sew selvage 798 at the inversion section 796 being external the finally fabricated airbag cushion 712.

As will be appreciated, the turning inside out of the partially stitched together cushion in the above-described fabrication process may render undesirably complicated or difficult the inclusion in such an airbag cushion of the common types of internal cushion tethers. However, various of the other above-described airbag cushion features such as including: altering the permeability of a selected portion or more of a particular airbag cushion such as by the inclusion of a coating or altering the structure of the cushion material; inclusion of a sew line around the periphery of the cushion opening; inclusion of one or more reinforcement layers; and inclusion of one or more discrete vent holes can be combined in various combinations with such an airbag cushion design wherein the outer diameter sew selvage is largely contained within the cushion.

In addition, if desired, airbag module assemblies in accordance with the invention may additionally comprise or include an orientation feature such as to facilitate or otherwise provide confirmation of proper desired orientation of a particular airbag cushion relative to corresponding assembly hardware. For example, the assembly hardware may additionally include a locator pin or the like such as may be designed for passage through a corresponding locator device opening in the airbag cushion to ensure proper and consistent orientation of the airbag cushion relative to the assembly hardware. As will be appreciated and as is commonly known in the art, the assembly inclusion of such an orientation feature may be particularly desirable in those assembly combinations wherein the respective airbag cushion includes one or more features, such as discrete vent holes or openings and tethers, for which either or both proper and consistent orientation may be desired.

In view of the above, it will be appreciated that the invention provides improved arrangements and methods for attaching airbag cushions such as used in an inflatable restraint system such as used to provide protection to vehicle occupants. In particular, at least certain of the subject forms of airbag cushion attachment have been found to advantageously avoid or minimize at least some of the difficulties associated with certain prior art airbag cushion attachment arrangements and methods.

For example, the invention provides improved arrangements and methods for attaching airbag cushions which avoid or minimize deployment stress concentrations such as may undesirably occur in airbag cushion attachments that include one or more finite clamping points such as in the form of rivets, bolts or other, similar, fastening means. For example, rather than concentrating the deployment associated stresses at fixed and concentrated clamping points such as may occur with clamping fasteners such as rivets and bolts, the subject form of airbag cushion attachment is believed to more evenly distribute or transfer the deployment associated stresses throughout a greater portion or area of the airbag cushion material. As a result, deployment stress concentrations such as may undesirably result in stretching, tearing or other failure of the airbag cushion material can be avoided.

Further, the invention provides improved arrangements and methods for attaching airbag cushions such as to minimize or avoid the inclusion of multiple layers of reinforcement material and the use of clamping force to retain the airbag cushion during the deployment process. As will be appreciated, the inclusion of such reinforcements can undesirably increase assembly weight or cost.

Thus, it is to be appreciated that the invention can provide airbag cushion arrangements and methods for attaching such airbag cushions which can significantly reduce material, processing and assembly costs while performing to the high standards normally associated with such inflatable restraint systems.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention and are thus within the scope of the subject invention.

What is claimed is:

1. An airbag module combination comprising:
   an inflatable airbag cushion, the cushion including an inflatable body defining an opening wherethrough, upon deployment of the cushion, gases can exit to at least in part deflate the cushion and
   a module element having a longitudinal length, the module element extending through the cushion opening and having opposed first and second ends with the first end disposed within the inflatable body and the second end extending out of the inflatable body,
   wherein, upon inflation of the cushion, the cushion opening is movable relative to the module element along the longitudinal length thereof and wherein the first end of the module element includes a stop to limit movement of the cushion opening relative to the longitudinal length of the module element.

2. The airbag module combination of claim 1 wherein a sew line of reinforcing stitches is included around the cushion opening.

3. The airbag module combination of claim 2 wherein the sew line secures at least one reinforcement layer of material to the cushion.

4. The airbag module combination of claim 1 wherein the cushion inflatable body includes at least a coated front panel.

5. The airbag module combination of claim 1 wherein the cushion inflatable body includes a coated back panel whereat the cushion opening is located, the back panel also including at least one discrete vent opening.

6. The airbag module combination of claim 1 wherein the cushion inflatable body includes at least one front panel and at least one back panel, the cushion further including an internal tether directly attached to at least the front panel.

7. The airbag module combination of claim 6 wherein the internal tether is further directly attached to the back panel.

8. The airbags module combination of claim 1 wherein the airbags cushion is sewn and forms a sew selvage, wherein the sew selvage is outside the cushion inflatable body.

9. The airbags module combination of claim 1 wherein the airbag cushion is sewn and forms a sew selvage, wherein the sew selvage is at least partially contained within the cushion inflatable body.

10. The airbag module combination of claim 1 and additionally comprising a module component housed within the airbag cushion.

11. The airbag module combination of claim 10 wherein the module component is substantially planar and coplanar with the cushion inflatable body in the vicinity of the opening.

12. The airbag module combination of claim 11 wherein the module element is an inflator diffuser extending from an inflator disposed outside of the inflatable body, the diffuser having a distal, gas diffusing end projecting within the inflatable body and to which end the module component is attached.

13. The airbag module combination of claim 10 wherein the module component is an airbag inflator.

14. The airbag module combination of claim 13 wherein the inflator includes at least one longitudinally-extending projection forming the module element extending through the cushion opening.

15. An airbag module combination comprising:
an inflatable airbag cushion, the cushion including an inflatable body defining an opening wherethrough, upon deployment of the cushion, gases can exit to, at least in part, deflate the cushion and
an inflator housed within the cushion inflatable body, the inflator including at least one longitudinally-extending projection having a longitudinal length and extending through the cushion opening whereby an end of the longitudinally-extending projection extends out of the inflatable body,
wherein, upon inflation of the cushion, the cushion opening is movable relative to the longitudinally-extending projection along the longitudinal length thereof and wherein the inflator forms a stop to limit movement of the cushion opening relative to the longitudinal length of the projection.

16. The airbag module combination of claim 15 wherein a sew line of reinforcing stitches is included around the cushion opening.

17. The airbag module combination of claim 16 wherein the sew line secures at least one reinforcement layer of material to the cushion.

18. The airbag module combination of claim 15 wherein the cushion inflatable body includes at least a coated front panel.

19. The airbag module combination of claim 15 wherein the cushion inflatable body includes a coated back panel whereat the cushion opening is located, the back panel also including at least one discrete vent opening.

20. The airbag module combination of claim 15 wherein the cushion inflatable body includes at least one front panel and at least one back panel, the cushion further including an internal tether directly attached to at least the front panel.

21. The airbag module combination of claim 20 wherein the internal tether is further directly attached to the back panel.

22. The airbag module combination of claim 15 wherein the airbag cushion is sewn and forms a sew selvage, wherein the sew selvage is outside the cushion inflatable body.

23. The airbag module combination of claim 15 wherein the airbag cushion is sewn and forms a sew selvage, wherein the sew selvage is at least partially contained within the cushion inflatable body.

24. A method of joining an inflatable airbag cushion in an airbag module, said method comprising the step of:
forming an airbag module combination including an inflatable airbag cushion with an inflatable body defining an opening wherethrough, upon deployment of the cushion, gases can exit to, at least in part, deflate the cushion and a module element having a longitudinal length, the module element extending through the cushion opening and having opposed first and second ends with the first end disposed within the inflatable body and the second end extending out of the inflatable body, wherein the cushion opening is movable relative to the module element along the longitudinal length thereof upon inflation of the cushion and wherein the first end of the module element includes a stop to limit movement of the cushion opening relative to the longitudinal length of the module element upon inflation of the cushion.

25. In the method of claim 24 wherein the airbag cushion comprises at least a front and a back panel the additional step of:
joining the front and back panels together about their respective peripheries.

26. The method of claim 25 wherein prior to completely joining together the front and back panels, a module component is placed within the airbag cushion.

27. The method of claim 26 wherein the module component is substantially planar and coplanar with the cushion inflatable body in the vicinity of the cushion opening and wherein the module element is an inflator diffuser extending from an inflator disposed outside of the inflatable body, the diffulser having a distal, gas diffusing end projecting within the inflatable body, additionally comprising the step of:
securing the module component with the diffuser end projecting within the cushion inflatable body.

28. The method of claim 26 wherein the module component is an airbag inflator which includes at least one longitudinally-extending projection forming the module element extending through the cushion opening.

29. The method of claim 24 wherein the cushion includes a sew line of reinforcing stitches around the cushion opening and securing at least one reinforcement layer of material to the cushion, wherein the step of forming the airbag module combination comprises the step of:

extending the module element through both the cushion opening and the at least one reinforcement layer of material.

30. The method of claim 24 wherein the cushion includes an internal tether, the tether having an opening generally corresponding to the cushion opening, wherein the step of forming the airbag module combination comprises the step of:

extending the module element through both the cushion opening and the tether opening.

* * * * *